May 7, 1963 F. LARSON 3,088,699
RETRACTABLE LANDING GEAR
Filed June 1, 1961 3 Sheets-Sheet 1
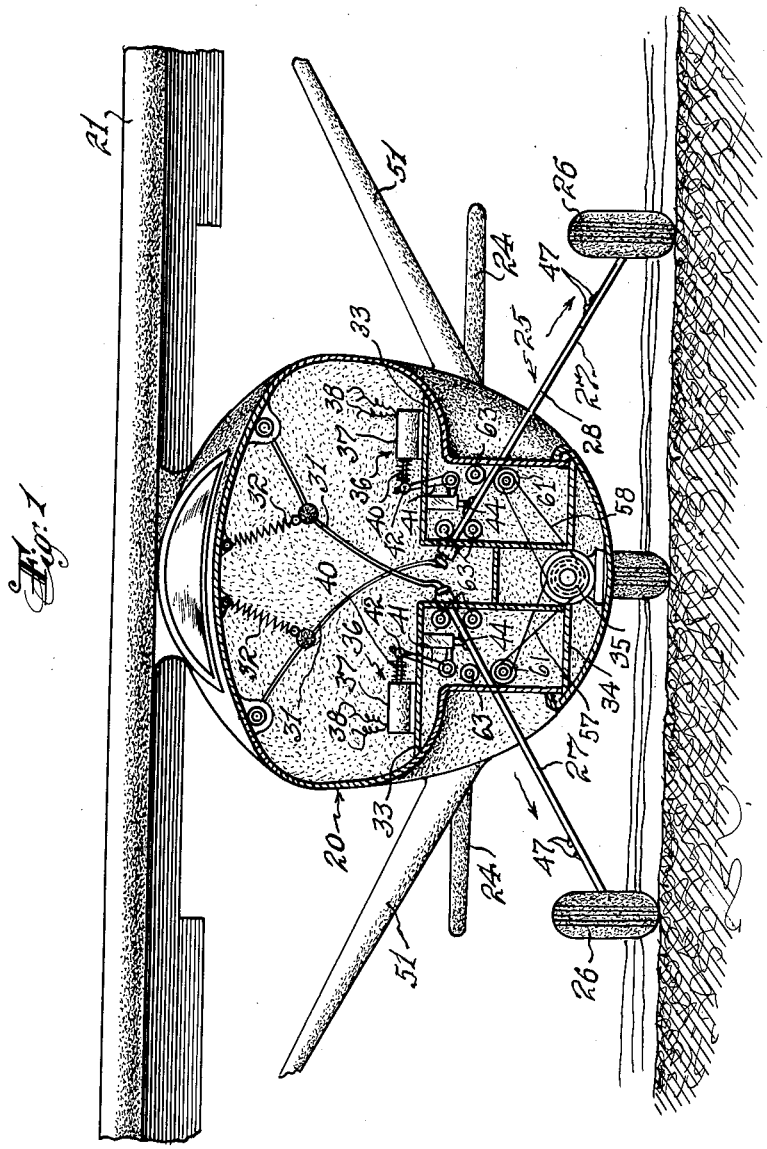
INVENTOR.
Fred Larson
BY Victor J. Evans & Co.
ATTORNEYS May 7, 1963    F. LARSON    3,088,699
RETRACTABLE LANDING GEAR
Filed June 1, 1961    3 Sheets-Sheet 2
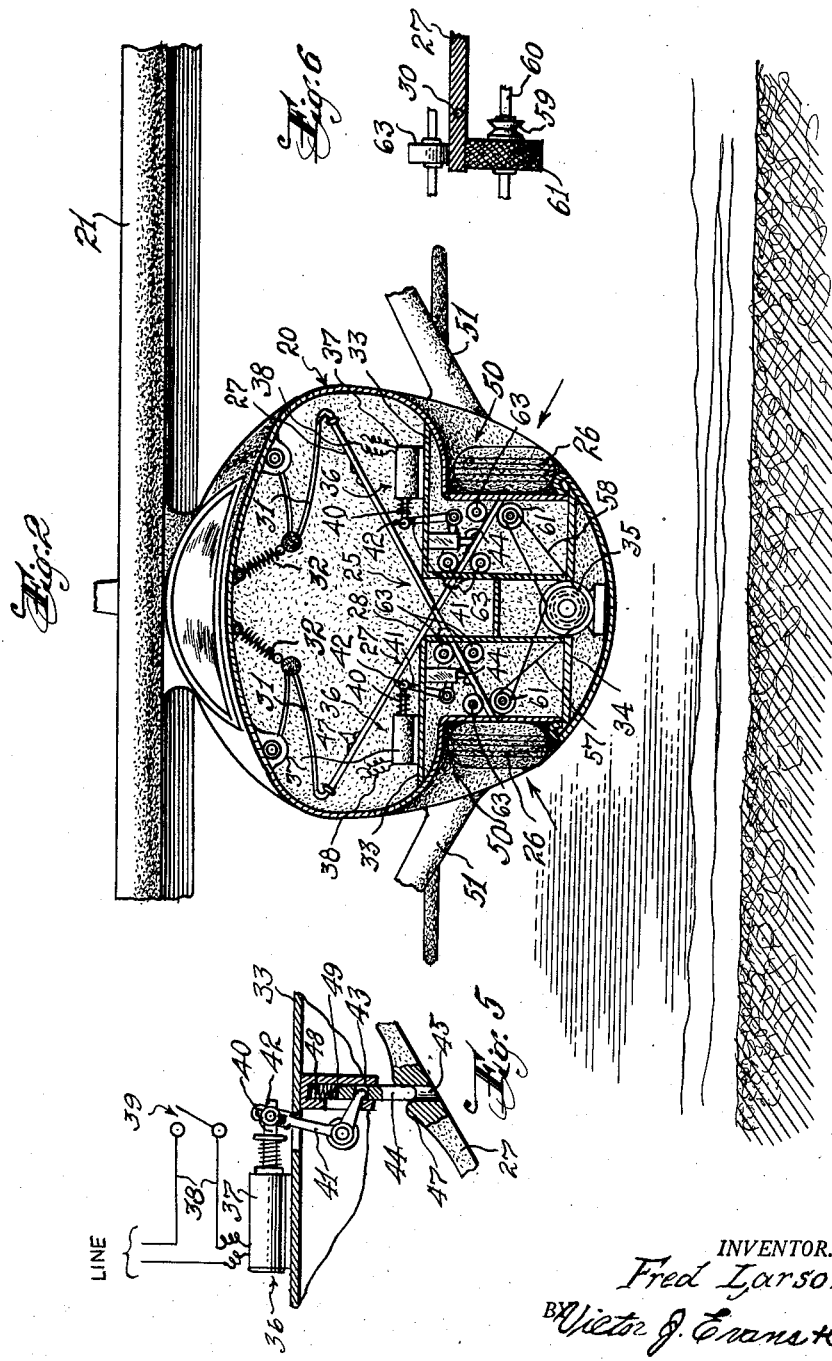
INVENTOR.
Fred Larson
BY Victor J. Evans & Co.
ATTORNEYS

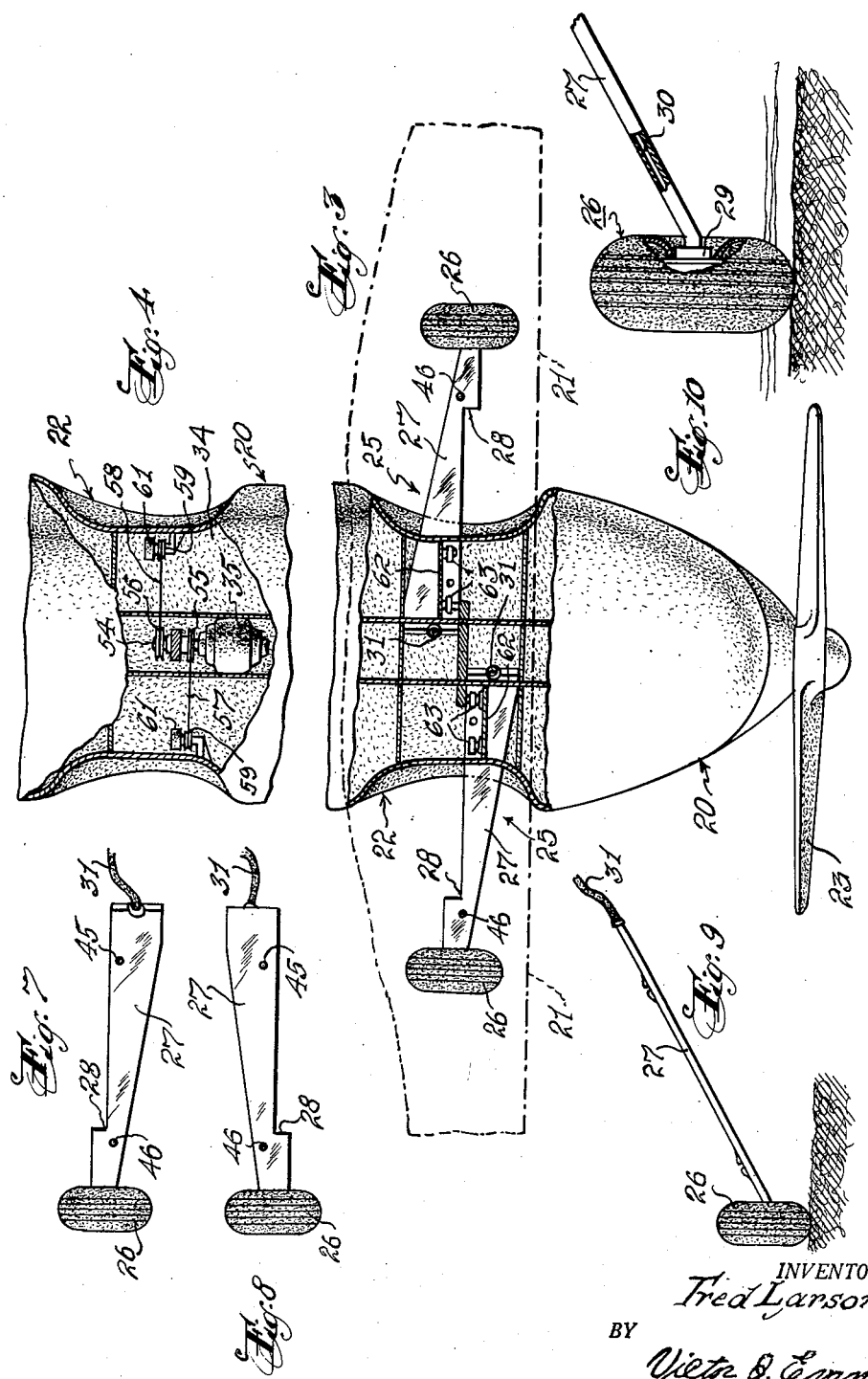

United States Patent Office 3,088,699
Patented May 7, 1963

3,088,699
RETRACTABLE LANDING GEAR
Fred Larson, 2313 SE. 3rd Ave., Vero Beach, Fla.
Filed June 1, 1961, Ser. No. 114,106
3 Claims. (Cl. 244—102)

The present invention relates to an airplane, and more particularly to a retractable landing gear for an airplane or aircraft.

The primary object of the present invention is to provide a retractable landing gear for an airplane such as a relatively small lightweight airplane, and wherein the present invention provides a means whereby the front landing wheels or undercarriage can be retracted after the airplane takes off so as to help reduce wind resistance or drag on the airplane which would occur if the wheels were permitted to remain in extended position below the fuselage.

A further object of the invention is to provide a retractable landing gear of the type stated wherein there is provided a means for causing extension or retraction of the airplane landing wheels, and wherein there is also provided a locking means for safely maintaining the landing wheels locked in extended or retracted position as desired or required.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a semi-diagrammatic view, with parts broken away and in section, looking towards the front end of an airplane and showing the landing wheels extended.

FIGURE 2 is a view generally similar to FIGURE 1 but showing the landing wheels retracted.

FIGURE 3 is a fragmentary cross sectional view, taken in plan, and with the landing wheels in extended position as shown in FIGURE 1.

FIGURE 4 is a fragmentary sectional view showing the motor means and belts and roller drive for actuating the struts of the landing wheels.

FIGURE 5 is a fragmentary sectional view showing details of the locking mechanism for maintaining the landing wheels extended or retracted.

FIGURE 6 is a fragmentary sectional view showing a guide wheel and drive roller for a strut.

FIGURE 7 is a plan view of one of the struts with a wheel and hose attached thereto.

FIGURE 8 is another view of a strut.

FIGURE 9 is an elevational view of a strut and wheel taken at right angles to the view shown in FIGURES 7 and 8.

FIGURE 10 is a fragmentary elevational view, with parts broken away and in section, illustrating the mounting of a landing wheel to the strut.

Referring in detail to the drawings, the numeral 20 indicates an aircraft or airplane which is provided with a fuselage 22 and a wing 21 as well as the usual propeller 23, FIGURE 3, and the numeral 24 indicates a portion of the tail structure for the airplane 20.

According to the present invention there is provided a retractable landing gear which is indicated generally by the numeral 25, and the landing gear 25 is especially suitable for relatively small or lightweight aircraft, and as shown in the drawings the retractable landing gear 25 includes a pair of inclined movable struts or arms 27 which have landing wheels 26 operatively connected to the lower ends thereof, and as shown in FIGURES 7 and 8, the struts 27 are cutaway or recessed as at 28 so as to insure that there will be proper clearance as the struts move in and out of the fuselage 22. The numeral 29 indicates a brake mechanism which is operatively associated with each of the landing wheels 26 whereby the mechanism 29 can be used for controlling spinning or rotation of the wheels 26 in order to help prevent excessive wear on the rubber tires of the wheels during landing of the aircraft.

The struts 27 are provided with passageways 30 therein whereby hydraulic fluid, air under pressure or other actuating substances can be conveyed from a suitable source of supply and pumped through flexible hoses or conduits 31 and through the passageways 30 in order to provide a means for actuating the mechanisms 29, and as shown in FIGURE 2 spring members or coil springs 32 are suitably connected to the flexible hoses 31 so as to take up slack in these hoses at the proper time.

Positioned within the fuselage 22 are horizontally disposed support members or walls 33 and 34, and the numeral 35 indicates a reversible electric motor which is mounted in the lower portion of the fuselage 22, and the motor 35 may be connected to a suitable source of electrical energy, and the motor 35 may have associated therewith an electrical circuit which includes a manually operable control switch for controlling actuation or rotation of the motor 35.

The numeral 36 indicates a locking mechanism for maintaining the landing wheels safely locked in extended or retracted position, and there is provided one of the locking mechanisms 36 for each wheel and strut, and as shown in FIGURE 5 each locking mechanism 36 includes a solenoid 37 which is suitably secured in place on an upper support member 33, and the numerals 38 indicate conductors or wires which are adapted to be electrically connected to the solenoid 37, and a hand switch 39 is electrically connected to the solenoid 37, as shown in the drawings. The numeral 40 indicates a movable plunger which is actuated by the solenoid 37, and a bell crank lever 41 is pivotally connected to the plunger 40 as at 42, and the lever 41 is pivotally connected to a locking pin or dog 44 as at 43. The pins 44 are mounted for movement into and out of engagement with openings 45 and 46 in the struts 27, and as shown in FIGURE 5, tapered or beveled shoulders 47 are arranged in the vicinity of the openings 45 and 46 in order to provide a guiding surface for the pins 44. The pins 44 are movably mounted and depend from casings 49, and coil springs 48 are positioned in the casings 49 for biasing the pins 44 in the proper direction, and the casings 49 are adapted to be secured to or formed integral with the upper support members 33.

There is provided in the lower side portions of the fuselage 22, recessed areas or portions 50 which are adapted to snugly receive therein the wheels 26 when the landing gear is retracted, as for example as shown in FIGURE 2. The numeral 51 indicates the usual braces or struts which extend between the fuselage 22 and the wing 21. The struts 27 are mounted for extended or retracted movement through openings or slots 52 in the wall portion 53 of the fuselage 22.

The numeral 54 indicates a shaft which is driven by the reversible motor 35, and a pair of pulleys 55 and 56 are mounted on and affixed to the shaft 54. A pair of endless belts 57 and 58 are trained around the pulleys 54 and 55, and the belt 58 is adapted to have its runs traveling in a generally straight direction, as for example as shown in FIGURE 2, while the runs of the belt 57 are arranged in criss-cross relation with respect to each other, and this arrangement of having one of the belts such as the belt 58 with a portion thereof in criss-cross relation is such that both struts 27 will be simultaneously retracted or extended in the desired manner. In other words if one of the belts such as the belt 58 did not have a portion thereof in criss-cross relation, upon actuating of the motor 35, one strut 27 would move in while the other would move out.

The upper portions of the belts 57 and 58 are arranged in engagement with pulleys 59 that are suitably affixed to driven shafts 60 and the shafts 60 may be journaled in wall members 62. Drive rollers 61 are suitably affixed to the shafts 60, and these drive rollers 61 frictionally engage the struts 27, so as to cause the struts to move to extended or retracted positions at the proper time.

As shown in the drawings guide wheels 63 are provided on opposite sides of the struts for serving to maintain the struts in their proper aligned position as they move in and out of the fuselage.

From the foregoing, it is apparent that there has been provided a retractable landing gear for an airplane and the present invention is especially suitable for use with smaller types of aircrafts, and in use with the parts arranged as shown in the drawings, it will be seen that when the airplane is landing or taking off, the wheels 26 of the landing gear 25 are in the extended position as for example as shown in FIG. 1, and the locking mechanism 36 serves to safely maintain the wheels and landing gear in extended position during this time. When the airplane is flying through the air, the wheels and landing gear are retracted or moved to the position shown in FIGURE 2 so that there will be less wind resistance and less drag whereby the aircraft can more conveniently and readily fly through the air.

To move the landing gear to extended or retracted position, it is only necessary to actuate the reversible motor 35, and as the motor 35 is actuated it rotates the shaft 54 so as to cause the belts 57 and 58 to travel, and this traveling motion of the belts 57 and 58 results in rotation of the drive rollers 61, and since the drive rollers 61 are arranged in frictional engagement with the pair of struts 27, it will be seen that by causing the drive rollers 61 to rotate in one direction, the struts 27 can be extended, and by causing the drive rollers 61 to rotate in the opposite direction, the struts 27 can be retracted. The struts 27 are cutaway or recessed as at 28 so as to provide sufficient clearance in order to permit the struts to move in without jamming, and it will be seen that when the parts move into the fuselage as shown in FIGURE 2, the struts are arranged in criss-cross relation with respect to each other, and the wheels 26 are snugly received in the recessed portions 50 adjacent the lower outer portions of the fuselage in order to present a generally streamlined effect for the aircraft.

There is provided the locking mechanism 36 which embodies the pin 44 that is adapted to engage an opening 45 or 46 in a strut 27, and for example with the pin 44 urged into an opening 45 by means of the string 48, it will be seen that the strut will be locked outwardly or in extended position. Similarly with the pin 44 arranged in engagement with an opening or aperture 46, the strut will be locked safely in retracted position. Before the struts are moved, the hand switch 39 is adapted to be manually actuated in order to energize the solenoid 37 so as to move the plunger 40 which in turn pivots the bell crank 41 whereby the pin 44 can be withdrawn from an opening 45 or 46 in order to permit the strut 27 to be moved by the friction drive rollers 61. The tapered shoulders or surfaces 47 adjacent the openings 45 and 46 provide a guiding surface for the pins 44 so as to help insure that the locking action takes place smoothly and efficiently.

The struts 27 are provided with elongated ducts or passageways 30 which are adapted to be used for conveying hydraulic fluid, air under pressure or the like to the mechanisms or units 29 which are of convention construction, and these units 29 may be used for causing the wheels 26 to spin just before the airplane lands in order to help reduce unnecessary wear on the rubber tires of the wheels. The passageways 30 are adapted to be connected to a suitable source of supply of hydraulic fluid, air or the like by means of the hoses or conduits 31, and these hoses 31 are of the flexible type, and as the struts 27 move in or out, the coil springs 32 provide a means for automatically taking up slack in the hoses.

The parts can be made of any suitable material and in different shapes or sizes.

Due to the provision of the reversible motor 35, the drive rollers 61 can be driven or rotated in a clockwise or counter-clockwise direction in order to efficiently and effectively extend or retract the landing gear.

The retractable landing gear mechanism of the present invention is especially suitable for use with airplanes having high wings. By retracting the landing gear after the plane takes off, the speeds of the airplane will be substantially increased, as for example the airplane may have its speed increased from twenty to thiry miles per hour with the same horsepower. In addition, the landing gear of the present invention is inexpensive to make and ruggedly constructed and is safe in operation.

The springs 32 are adapted to be used for taking up slack on the flexible tubes 31 which are adapted to be used for supplying hydraulic fluid to the hydraulic brakes 29. The rollers 61 can be made of rubber, and a plate may be used for holding the wheel struts apart when retracted. Instead of using the belts 57 and 58, a chain drive can be used, and a gear mechanism can also be utilized as the power driving means. The wheels 26 are adapted to be retracted into the portions such as the recessed portions 50 in the side of the airplane, or else other types of recesses or caviites can be provided for receiving the wheels when the wheels are retracted. Limit stop members can be used for preventing the struts from being extended too far out of the fuselage.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as defined in the appended claims.

What is claimed is:

1. In an airplane, a fuselage having recessed portions in the lower side portions thereof, a retractable landing gear comprising a pair of inclined struts, wheels connected to the lower ends of said struts, brake mechanisms operatively associated with said wheels, said struts having passageways therein for conveying an actuating medium to said brake mechanisms, hoses operatively connected to said passageways, spring members connected to said hoses, upper and lower horizontally disposed support members mounted in said fuselage, locking mechanisms each comprising a solenoid mounted on an upper support member, spring pressed plungers connected to said solenoids, a bell crank lever connected to each plunger, casings depending from the upper support members, vertically disposed spring pressed pins extending downwardly from said casings, there being a pair of spaced apart apertures in each strut for selectively receiving said pins, a reversible electric motor mounted in the lower portion of said fuselage, a shaft driven by said motor, pulleys mounted on said shaft, endless belts trained around said pulleys, drive rollers operatively driven by said belts and said drive rollers frictionally engaging said struts, and guide wheels arranged in engagement with said struts.

2. The structure as defined in claim 1 wherein said struts are provided with opposed elongated recessed cutaway portions.

3. The structure as defined in claim 1 wherein one of said belts has portions thereof arranged in criss-cross relationship.

References Cited in the file of this patent

UNITED STATES PATENTS

| | | |
|---|---|---|
| 1,097,816 | McCarroll | May 26, 1914 |
| 1,662,915 | Burnelli | Mar. 20, 1928 |
| 1,812,211 | McCrea | June 30, 1931 |
| 1,857,888 | Stout | May 10, 1932 |
| 2,429,992 | Crispell | Nov. 4, 1947 |
| 2,942,809 | Roy | June 28, 1960 |